(12) United States Patent
Miller et al.

(10) Patent No.: US 7,561,801 B2
(45) Date of Patent: Jul. 14, 2009

(54) OPTICAL TRANSCEIVER WITH ELECTRICAL RING DISTRIBUTION INTERFACE

(75) Inventors: Glen Miller, Haverhill, MA (US); Armin Schulz, Methuen, MA (US); Timothy P. Walker, Boxford, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 641 days.

(21) Appl. No.: 11/395,858

(22) Filed: Mar. 31, 2006

(65) Prior Publication Data

US 2007/0230955 A1 Oct. 4, 2007

(51) Int. Cl.
*H04J 14/00* (2006.01)
*H04B 10/20* (2006.01)

(52) U.S. Cl. ............... 398/59; 398/80; 398/81; 398/82; 398/43; 398/47; 398/66; 398/68

(58) Field of Classification Search ............ 398/66–73, 398/59, 80, 81, 82, 43, 47
See application file for complete search history.

(56) References Cited

U.S. PATENT DOCUMENTS

| | | | | |
|---|---|---|---|---|
| 4,596,982 A * | 6/1986 | Bahr et al. | .................. | 370/223 |
| 4,803,485 A * | 2/1989 | Rypinski | .................... | 370/452 |
| 5,251,213 A * | 10/1993 | Videlock et al. | ............ | 370/403 |
| 5,420,986 A * | 5/1995 | Baldwin et al. | ............. | 370/452 |
| 5,790,548 A * | 8/1998 | Sistanizadeh et al. | ....... | 370/401 |
| 5,880,864 A * | 3/1999 | Williams et al. | .............. | 398/71 |
| 6,035,340 A * | 3/2000 | Fischer et al. | ............. | 709/249 |
| 6,049,550 A * | 4/2000 | Baydar et al. | ............. | 370/466 |
| 6,052,819 A * | 4/2000 | Barker et al. | ................ | 714/776 |
| 6,175,552 B1 * | 1/2001 | Parry et al. | ................. | 370/216 |
| 6,175,569 B1 * | 1/2001 | Ellington et al. | ............ | 370/401 |
| 6,204,943 B1 * | 3/2001 | Hamel et al. | ................... | 398/9 |
| 6,356,559 B1 * | 3/2002 | Doucette et al. | ............ | 370/450 |
| 6,389,030 B1 * | 5/2002 | Coden | ......................... | 370/404 |
| 6,452,925 B1 * | 9/2002 | Sistanizadeh et al. | ....... | 370/352 |
| 6,483,812 B1 * | 11/2002 | Prorock | ....................... | 370/252 |
| 6,545,977 B2 * | 4/2003 | Harshavardhana et al. | .. | 370/222 |
| 6,792,005 B1 * | 9/2004 | Antosik et al. | .............. | 370/535 |
| 6,889,010 B2 * | 5/2005 | Trezza | ......................... | 398/130 |
| 6,950,448 B2 * | 9/2005 | Tornetta et al. | ............. | 370/537 |
| 6,970,127 B2 * | 11/2005 | Rakib | .......................... | 341/173 |
| 7,106,968 B2 * | 9/2006 | Lahav et al. | .................. | 398/47 |

(Continued)

*Primary Examiner*—Ken N Vanderpuye
*Assistant Examiner*—Danny W Leung
(74) *Attorney, Agent, or Firm*—Law Office of Gerald Maliszewski; Gerald Maliszewski

(57) ABSTRACT

A ring connection system and method are providing for distributing signals in an optical-to-electrical interface. The method electrically connects a plurality of nodes in a series-connecting ring, and receives an optical signal at a first node from a service provider. The method converts the optical signal to an electrical signal, and distributes the electrical signal via the ring. At each node, the electrical signal is supplied from a customer interface. Typically, each node has a plurality of customer interfaces. In one aspect, ITU-T G.984.3 Giagbit-capable Passive Optical Network (GPON) optical signals are received converted to a customer interface electrical signal such as an Ethernet connecting transfer mode, or time division multiplexed signal. Electrically connecting the plurality of nodes in the series-connected ring includes: series connecting the nodes in a North ring; and, series connecting the nodes in a South ring, opposite in direction from the North ring.

6 Claims, 6 Drawing Sheets

U.S. PATENT DOCUMENTS

| | | | |
|---|---|---|---|
| 7,162,155 B2* | 1/2007 | Handelman | 398/51 |
| 7,171,121 B1* | 1/2007 | Skarica et al. | 398/67 |
| 7,187,693 B2* | 3/2007 | Bamba | 370/468 |
| 7,266,296 B2* | 9/2007 | Ovadia et al. | 398/51 |
| 7,269,130 B2* | 9/2007 | Pitio | 370/217 |
| 7,324,548 B2* | 1/2008 | Natarajan et al. | 370/465 |
| 7,382,982 B2* | 6/2008 | Lee et al. | 398/100 |
| 7,409,154 B2* | 8/2008 | Wellen | 398/19 |
| 7,428,385 B2* | 9/2008 | Lee et al. | 398/100 |
| 7,492,714 B1* | 2/2009 | Liao et al. | 370/235 |
| 2002/0022952 A1* | 2/2002 | Zager et al. | 703/22 |
| 2002/0031120 A1* | 3/2002 | Rakib | 370/386 |
| 2003/0009599 A1* | 1/2003 | Lee et al. | 709/251 |
| 2003/0156536 A1* | 8/2003 | Oki et al. | 370/229 |
| 2003/0204746 A1* | 10/2003 | Cromer et al. | 713/201 |
| 2004/0175071 A1* | 9/2004 | Oberg | 385/24 |
| 2004/0218534 A1* | 11/2004 | Song et al. | 370/236.2 |
| 2004/0240483 A1* | 12/2004 | Lipski et al. | 370/535 |
| 2006/0140639 A1* | 6/2006 | Effenberger | 398/159 |
| 2006/0245755 A1* | 11/2006 | Gumaste et al. | 398/59 |
| 2007/0230955 A1* | 10/2007 | Miller et al. | 398/59 |

* cited by examiner

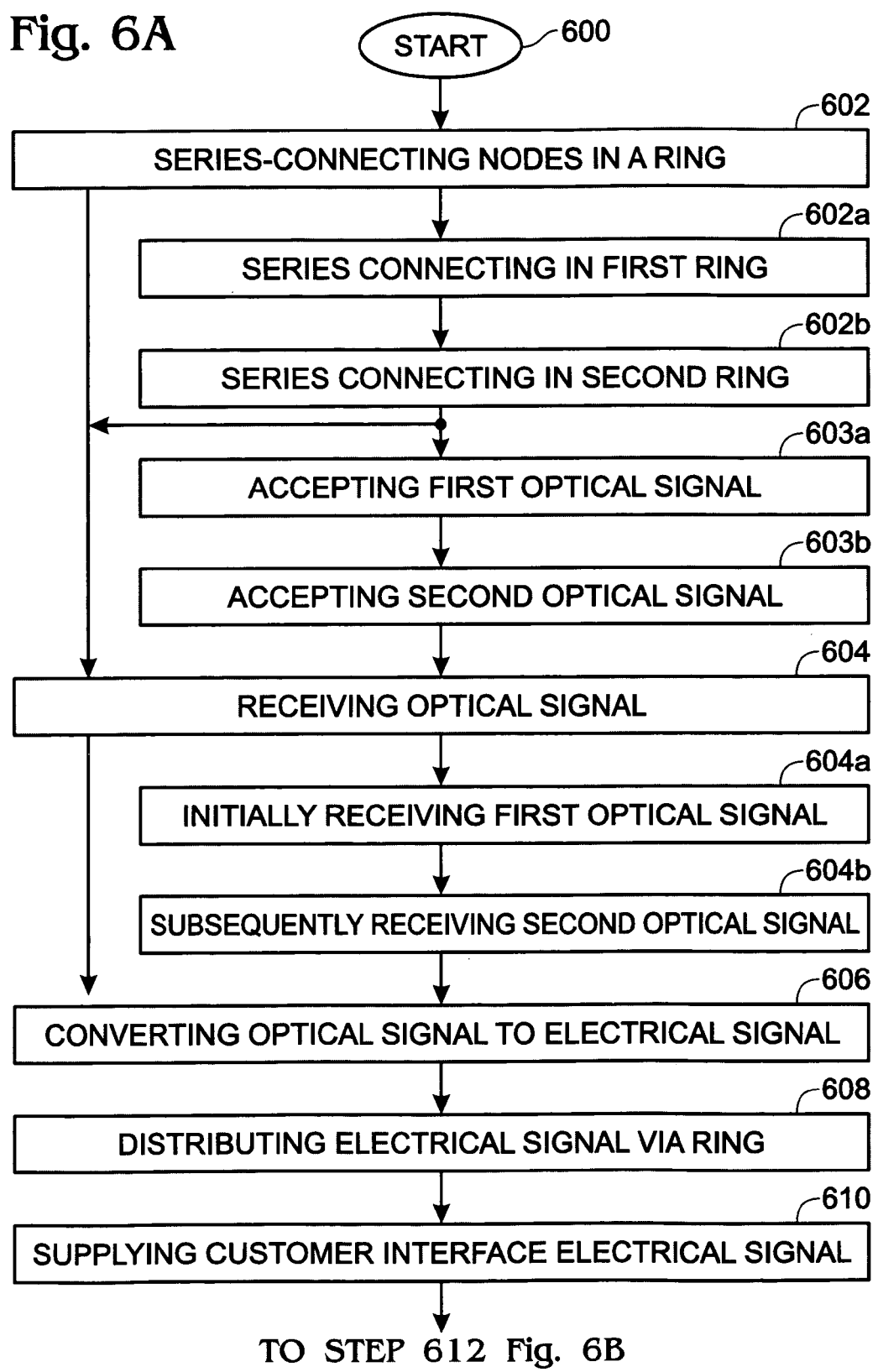

US 7,561,801 B2

OPTICAL TRANSCEIVER WITH ELECTRICAL RING DISTRIBUTION INTERFACE

BACKGROUND OF THE INVENTION

1. Field of the Invention

This invention generally relates to digital communications and, more particularly, to a system for efficiently distributing electrical communications signals, converted from optical network communications, via a ring of optical network units (ONUs).

2. Description of the Related Art

FIG. 1 is a schematic block diagram depicting a "triple play" system for distributing optical communication signals to a customer premise (prior art). A optical line terminal (ONT) broadcasts a ITU-T G.984.3 PON (GPON) optical signal out to many ONUs, which are typically outside units, or to many optical network terminals (ONTs), which are typically indoor units. The ONUs (ONTs) convert the GPON optical signal into video, telephone, and Ethernet electrical signals for use in the customer premise. The responses back from the various ONUs (ONTs) are converted to a GPON optical signal and time division multiplexed (TDM) back to the OLT. A typical single-family unit (SFU) may have four Ethernet ports.

Additional issues are presented when an OLT is interfaced with a multi-dwelling unit (MDU), such as an apartment building. Currently, there are two methods of interfacing an OLT to an MDU. One option is place an ONU in each apartment, and run optical fiber to each ONU. This option is hardware expensive, because multiple copies of the optic fiber must be run in parallel to each ONU. Alternately, a single ONU is assigned to the MDU. However, the ONU must have a network processor and Ethernet switch to bring out multiple ports. This option is software expensive, because software must be written to configure the network processor and Ethernet switch. Further, a policing function must be enabled to guarantee each user a Service Level Agreement (SLA) that includes some measure of privacy protection.

It would be advantageous if an MDU could be interfaced to an OLT GPON optical signal with a minimum expenditure of software and hardware assets, and development costs.

SUMMARY OF THE INVENTION

The present invention presents an ONU device that can convert GPON optical signals to a GPON electrical signal, for distribution in a system of ring-connected ONUs. Each ONU has three high-speed connections. One interface transceives optical signals (e.g., 2.5 GPON). There are also a ring North Rx/Tx interface, and a ring South Rx/Tx interface for electrical signals. In this manner, an entire multi-dwelling unit can be interfaced to the OLT via a single optical connection to just one of the ONUs. A second optical line may be run to another of the ONUs, if additional (redundant) optical protection is desired. Otherwise, the converted optical signal is distributed through the ring via the ring North and/or ring South interfaces.

Accordingly, a ring connection method is provided for distributing signals in an optical-to-electrical interface. The method electrically connects a plurality of nodes in a series-connected ring, and receives an optical signal at a first node from a service provider. The method converts the optical signal to an electrical signal, and distributes the electrical signal via the ring. At each node, the electrical signal is supplied from a customer interface. Typically, each node has a plurality of customer interfaces.

In one aspect, ITU-T G.984.3 Giagbit-capable Passive Optical Network (GPON) optical signals are received and converted to a customer interface electrical signal such as an Ethernet, asynchronous transfer mode (ATM), or time division multiplexed (TDM) signal.

Electrically connecting the plurality of nodes in the series-connected ring includes: series connecting the nodes in a first (North) ring; and, series connecting the nodes in a second (South) ring, opposite in direction from the first ring.

In another aspect, the method receives a customer interface electrical signal from a customer interface at each node. The received customer interface electrical signals from each node are multiplexed, and the multiplexed signals are distributed via the ring. Then, the multiplexed signals are converted to an optical signal, and transmitted to the OLT service provider.

Additional details of the above-described method, a ring-connected ONU, and a system of ring-connected ONUs are provided below.

BRIEF DESCRIPTION OF THE DRAWINGS

FIGS. 6A and 6B are flowcharts illustrating a ring connection method for distributing signals in an optical-to-electrical interface.

DETAILED DESCRIPTION

Figure 2:
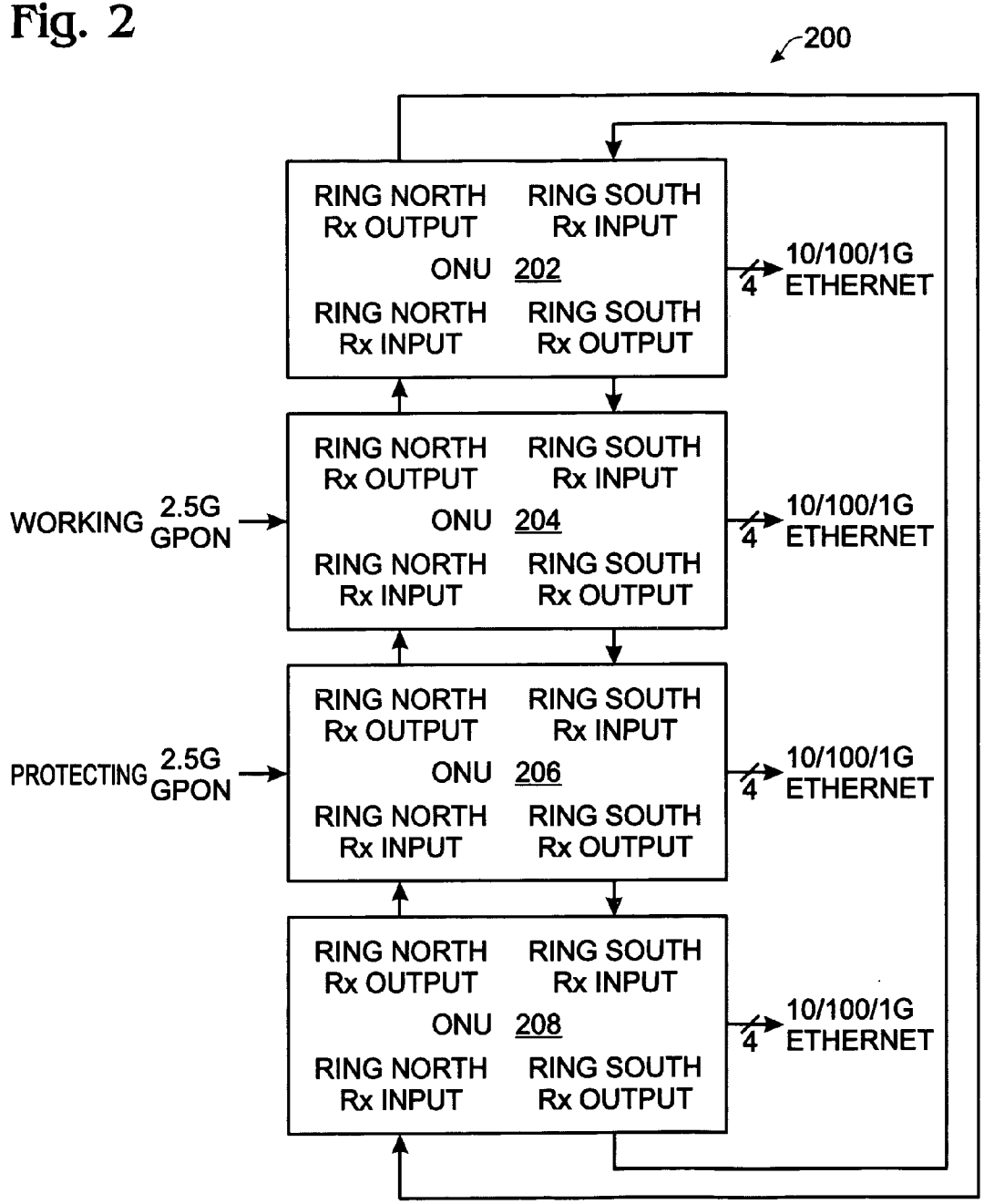
FIG. 2 is a schematic block diagram of a system of ring-connected optical network units (ONU) for distributing signals.

FIG. 2 is a schematic block diagram of a system of ring-connected optical network units (ONU) for distributing signals. The system 200 comprises a plurality of ONUs. Shown are ONUs 202, 204, 206, and 208. In other aspects, up to 64 ONUs may be ring-connected. However, it should be understood that the system is not inherently limited to any particular number of ONUs.

Figure 3:
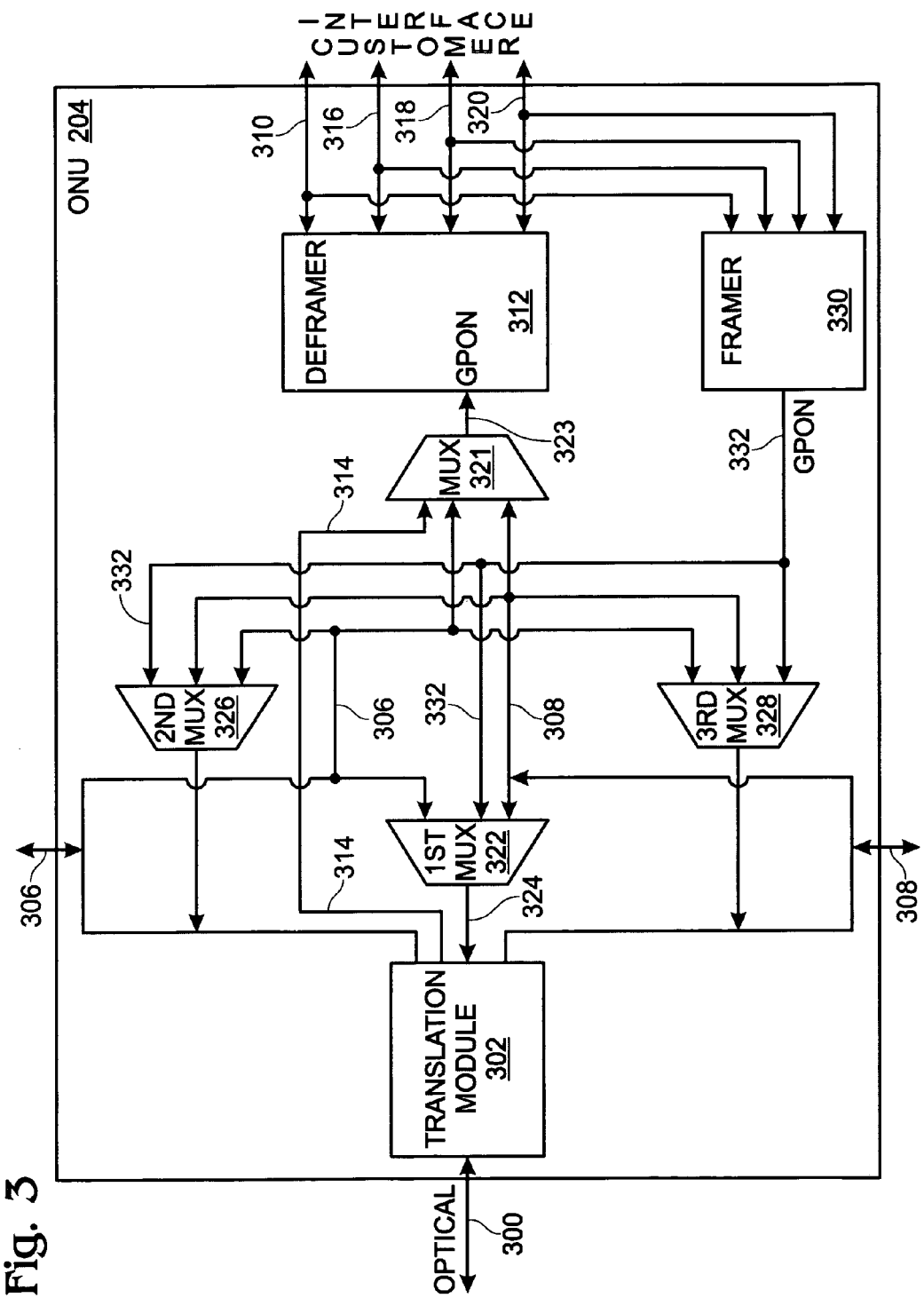
FIG. 3 is a schematic block diagram of a ring-connected ONU for distributing signals.

FIG. 3 is a schematic block diagram of a ring-connected ONU for distributing signals. ONU 204 of FIG. 2 is used as an example, however, the following description could also be applied to the other ONUs in the system. ONU 204 comprises an optical port on line 300 for transceiving optical signals. An optical-to-electrical translation module 302 has an interface connected to the optical port on line 300, and an interface for transceiving electrical signals.

A first (North) ring port is connected to the translation module 302 on line 306 to transceive ring-connected electrical signals between a first ONU neighbor (i.e., ONU 202 of FIG. 2). A second (South) ring port connected to the translation module 302 on line 308 to transceive ring-connected electrical signals between a second ONU neighbor (i.e., ONU 206 of FIG. 2). A customer interface port on line 310 transceives customer interface electrical signals with a user.

Typically, a common downlink (downstream) signal is sent from the service provider (OLT) to all the users on line 300.

However, to control distribution of the signal, the signal is decrypted before it is provided to a user. For example, only customers paying a service charge to the service provider receive decrypted customer interface electrical signals. In this aspect, the translation module 302 converts an encrypted optical signal into an encrypted electrical signal. The encrypted electrical signal is distributed via the first and second ring ports, on lines 306 and 308, respectively. A deframer module 312 has an interface connected to the translation module on line 314 and an interface on line 310 to supply a decrypted electrical signal to the customer interface.

In one aspect, the translation module 302 receives a ITU-T G.984.3 Giagbit-capable Passive Optical Network (GPON) signal on line 300 and converts the GPON optical signal into a GPON electrical signal, which is provided on lines 306, 308, and 314. The deframer module 312 converts the GPON electrical signal into a customer interface electrical signal.

Typically, there is a plurality of customer interfaces connected to the deframer module 312, each transceiving customer interface electrical signals with a user. Shown are four customer interfaces (310, 316, 318, and 320) per ONU. However, the ONU is not inherently limited to any particular number of customer interfaces. The deframer module 312 time division demultiplexes a GPON signal on line 314 into a customer interface electrical signal for each customer interface. For example, the customer interface electrical signal can be an Ethernet, asynchronous transfer mode (ATM), or time division multiplexing (TDM) signal. However, the deframer module 312 is not limited to any particular format or protocol.

In one aspect, each ONU further comprises a downlink multiplexer 321 having an interface connected to the ring ports on lines 306 and 308, and the translation module on line 314 to receive (GPON) electrical signals. The downlink MUX 321 has an interface connected to the deframer 312 on line 323 to supply a multiplexed (GPON) electrical signal.

With respect to the uplink, a first multiplexer (MUX) 322 has an interface connected to the ring ports on lines 306 and 308, as well as to the customer interface(s) (e.g. 310) to receive electrical signals. An interface is connected to the translation module 302 on line 324 to supply a multiplexed electrical signal. The translation module 302 converts multiplexed electrical signals into an optical signal, and transmits the optical signal on line 300.

In another aspect, a second multiplexer 326 has an interface connected to the ring ports 306 and 308 and the customer interface(s) (e.g. 310) to receive electrical signals. The second multiplexer 326 has an interface connected to supply multiplexed electrical signal to the first ring port on line 306. Likewise, a third multiplexer 328 has an interface connected to the ring ports 306 and 308 and the customer interface(s) (e.g., 310) to receive electrical signals. An interface is connected to supply multiplexed electrical signal to the second ring port on line 308.

The uplink messages to the OLT (service provider) are typically originated by the user. Therefore, security and eavesdropping protection from other users is a desirable feature. In one aspect, a framer module 330 has an interface to accept a plurality of customer interface electrical signals from a plurality of customer interfaces (e.g., 310, 316, 318, and 320). Again the framer module 330 is not limited to any particular number of customer interfaces. The framer module 330 has interface connected to the first, second, and third multiplexers on line 332 to supply the plurality of customer interface electrical signals framed into a GPON signal. In the event of an evolution in the GPON standard, or the use of a different optical standard, the framer module 330 can also be used to encrypt the customer interface electrical signals.

Note, although ONU 204 is shown with a connected and operating optical interface 300. Other ONUs in the ring-connected system (e.g. 202, see FIG. 2) need not necessarily have a connected optical interface to receive optical signals. That is, an ONU with an optical connection can receive converted optical signals from ONU 204 communicated via the ring connection. In another aspect, an ONU (i.e., ONU 206, see FIG. 2) may be connected to a backup line which can be selectively engaged is the main optical line develops a fault. Alternately, the protection optical line may continually send optical signals, but the ONU's translation module is selectively enabled to only convert optic/electrical signals in the event that the main optical line fails or ONU 204 fails.

Functional Description

Returning briefly to FIG. 2, each ONU has three potential high-speed interfaces: the optical (2.5 GPON) interface, the ring North interface, and the ring South interface. For the multi-dwelling case, a first ONU chip on a system board is hooked to the optical interface. A second ONU chip can be hooked to an optics line if optical protection is necessary. Otherwise, converted optical communications are distributed via the ring North and ring South interfaces. The system of FIG. 2 utilizes two types of protection. The main and protection lines provide 1+1 Optical protection, while the bidirectional rings provide protection from an ONU malfunction.

In the downlink direction, the OLT controls how much bandwidth each user receives. From the point of view of the OLT, the OLT cannot determine if it is communicating with a plurality of single family units (SFUs) or one Multi-Dwelling unit equipped with a ring-connected ONU system. Thus, the software used in both the OLT and ONT need not be modified, and the need for multiple optical receivers is eliminated.

Figure 1:
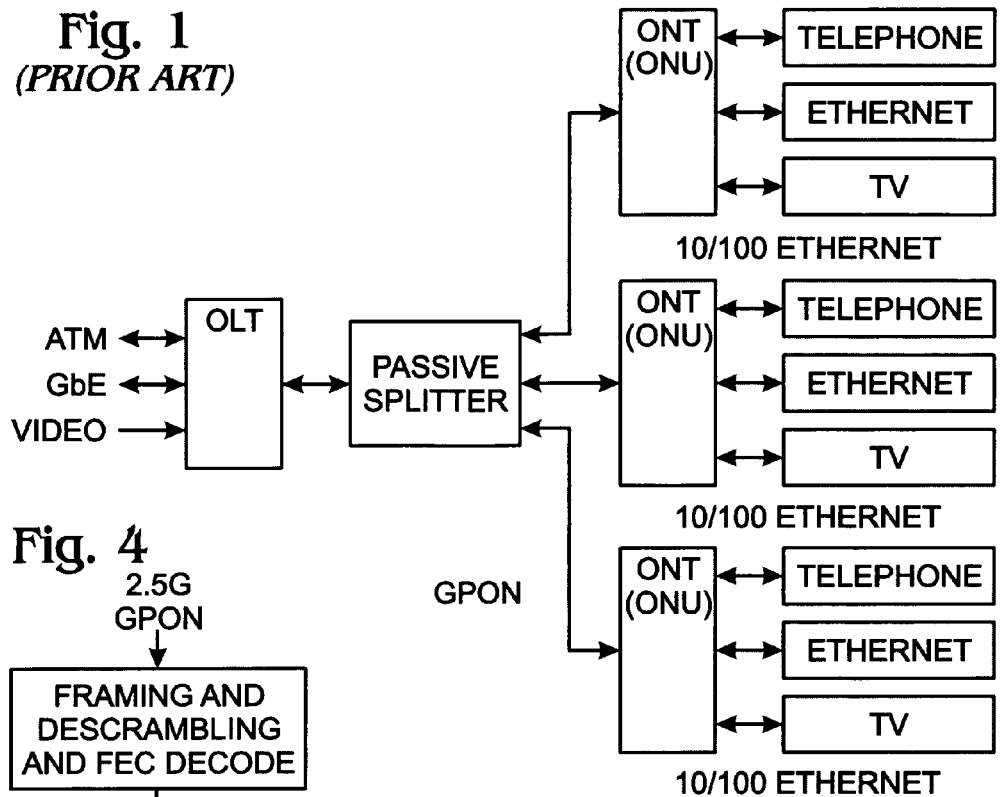
FIG. 1 is a schematic block diagram depicting a "triple play" system for distributing optical communication signals to a customer premise (prior art).
Figure 4:
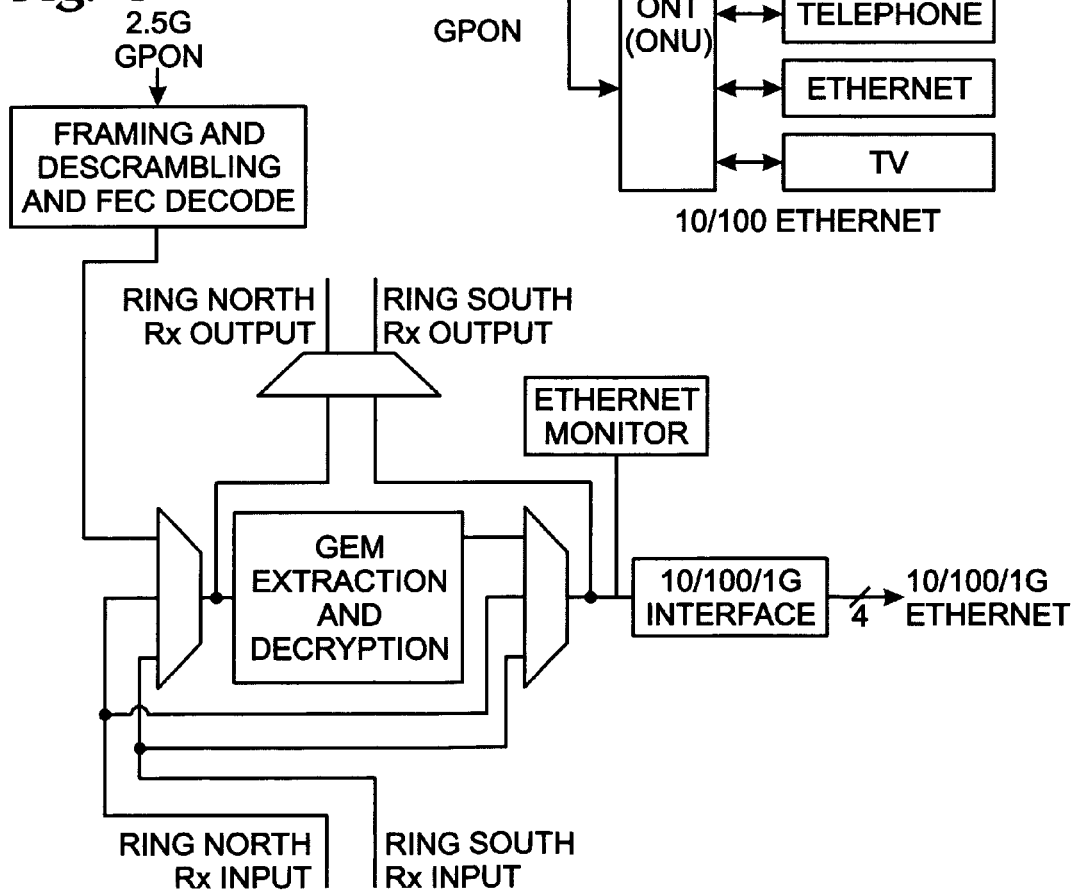
FIG. 4 is a schematic block diagram depicting downlink communication details of an exemplary ONU.

FIG. 4 is a schematic block diagram depicting downlink communication details of an exemplary ONU. Note that the ring input and output can combined either before, or after decryption. Typically, there is only a single key per ONU, however in other aspects, a separate decryption key can be used for each of the four Ethernet ports. The ring connections easily support 1+1 optical protection. Because the ONU's are in a ring, every ONU can "see" the protection signal after it has switched over from the main optical signal. This architecture permits each Ethernet customer interface port to have a dedicated protected bandwidth.

Figure 5:
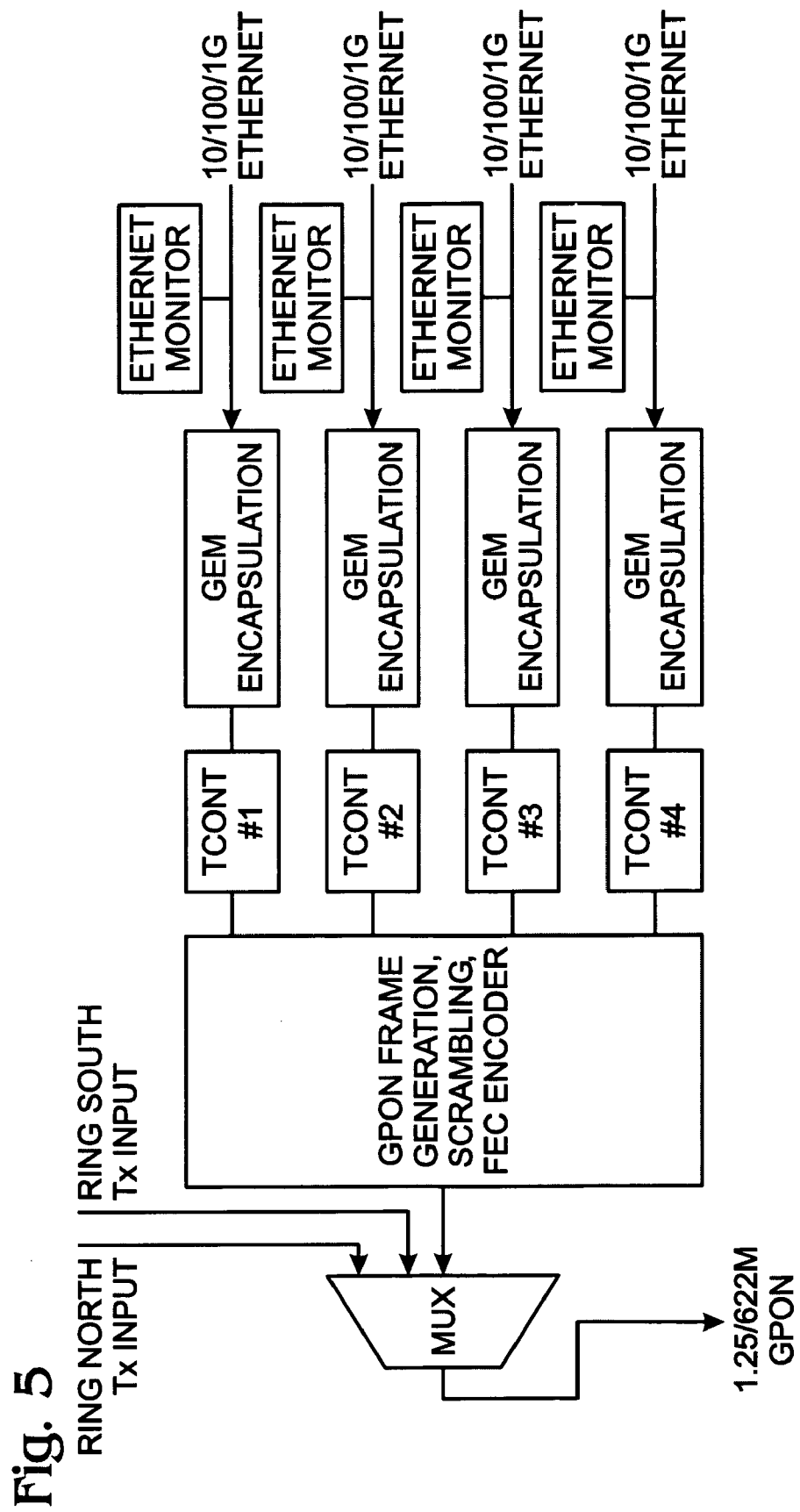
FIG. 5 is a schematic block diagram depicting uplink communication details of an exemplary ONU.

FIG. 5 is a schematic block diagram depicting uplink communication details of an exemplary ONU. The uplink (upstream) bandwidth is assigned by the OLT using a bandwidth map. The bandwidth map allocates a certain number of upstream timeslots to each traffic container (TCONT). In this manner, the OLT can control the uplink bandwidth assigned to each Ethernet customer interface port.

Without this architecture, an Ethernet switch would be required for the multi-dwelling scenario, which would require the addition of hardware to control how much uplink bandwidth is assigned to each customer interface port. However, if the ONU chips are ring-connected as shown in FIGS. 2 and 5, then each Ethernet customer interface port gets it's own traffic container. From the point of view of the OLT, the OLT cannot determine if it is connected to four transmitting SFU's, or one MDU enabled with a ring-connected system with four ONUs. Thus, the ONU and OLT software need not be changed to accommodate the ring-connected ONU system. Note, FIG. 5 shows only a single MUX with an output connected to the optical interface. In other aspects, MUXs having the same inputs as the displayed MUX are used, one MUX for each ring connection (see FIG. 3).

Figure 6B:
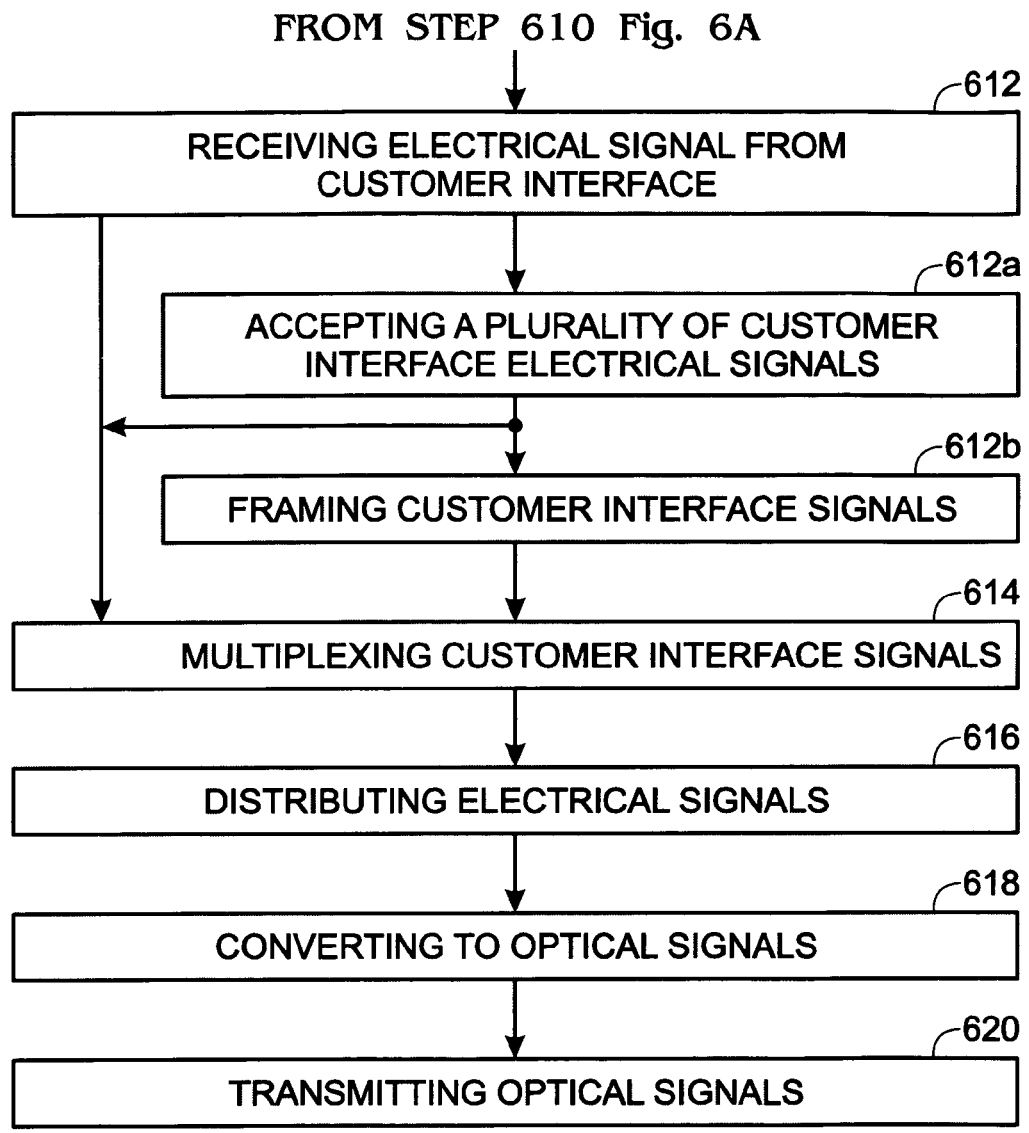

FIGS. 6A and 6B are flowcharts illustrating a ring connection method for distributing signals in an optical-to-electrical interface. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 600.

Step 602 electrically connects a plurality of nodes in a series-connected ring. Step 604 receives an optical signal at a first node from a service provider (OLT). Step 606 converts the optical signal to an electrical signal. Step 608 distributes the electrical signal via the ring. Step 610 supplies the electrical signal from a customer interface at each node. In one aspect, Step 610 supplies a plurality of customer interface electrical signals from a corresponding plurality of customer interface ports at each node.

In one aspect, receiving the optical signal from the service provider in Step 604 includes receiving a ITU-T G.984.3 Giagbit-capable Passive Optical Network (GPON) signal. Then, converting the optical signal to the electrical signal in Step 606 includes converting to a customer interface electrical signal such as an Ethernet, ATM, or TDM signal. Typically, Step 610 time division demultiplexes the GPON signal into the plurality of customer interface electrical signals.

In another aspect, electrically connecting the plurality of nodes in the series-connected ring in Step 602 includes substeps. Step 602a series connects the nodes in a first (North) ring. Step 602b series connects the nodes in a second (South) ring, opposite in direction from the first ring.

In a different aspect, converting the optical signal to the electrical signal in Step 606 includes converting an encrypted optical signal into an encrypted electrical signal. Then, supplying the electrical signal from the customer interface in Step 610 includes selectively decrypting the encrypted electrical signal at each node. In another aspect, Step 610 multiplexes customer interface electrical signals that are supplied from ring-connected nodes. If the node (e.g. the first node) happens to be directly connected to the optical interface, as opposed to being indirectly connected via the bidirectional ring interface, then the converted optical signal is multiplexed together with the electrical signals supplied by the ring-connected nodes. A multiplexed customer interface electrical signal is then supplied to a customer interface.

In one aspect, Step 603a accepts a first (Working) optical signal at the first node. Step 603b accepts a second (Protection) optical signal at a second node. Then, receiving the optical signal from the service provider in Step 604 includes substeps. Step 604a initially converts the first optical signal to an electrical signal. Step 604b converts the second optical signal to the electrical signal in the event of an optical line fault.

In another aspect, Step 612 receives a customer interface electrical signal from a customer interface. At each node, Step 614 multiplexes the received customer interface electrical signals from each node. Step 616 distributes the multiplexed electrical signals via the ring. Step 618 converts the multiplexed electrical signals into an optical signal. Step 620 transmits the optical signal to the service provider.

In one aspect, receiving the electrical signal from the customer interface at each node (Step 612) includes substeps. Step 612a accepts a plurality of customer interface electrical signals from a plurality of customer interfaces. Step 612b frames the plurality of customer interface electrical signals into a GPON signal.

An optical/electrical interface system and method have been provided for the ring connection distribution of electrical signals. Some examples of particular subcircuits, circuit connections, and communication protocols have been given to illustrate the invention. However, the invention is not limited to merely these examples. Other variations and embodiments of the invention will occur to those skilled in the art.

We claim:

1. A ring-connected optical network unit (ONU) for distributing signals, the ONU comprising:
    an optical port for transceiving optical signals;
    an optical-to-electrical translation module having an interface connected to the optical port, and an interface for transceiving electrical signals, the translation module converting multiplexed electrical signals into optical signals, and transmitting the optical signals;
    a first (North) ring port connected to the translation module for the ring-connected transceiving of electrical signals;
    a second (South) ring port connected to the translation module for the ring-connected transceiving of electrical signals;
    a plurality of customer interfaces, each transceiving electrical signals with a user;
    a first multiplexer having an interface connected to the ring ports and the customer interface to receive electrical signals, and an interface connected to the translation module to supply a multiplexed electrical signal; and,
    a second multiplexer having an interface connected to the ring ports and the customer interface to receive electrical signals, and an interface connected to supply multiplexed electrical signal to the first ring port;
    a third multiplexer having an interface connected to the ring ports and the customer interface to receive electrical signals, and an interface connected to supply multiplexed electrical signal to the second ring port; and,
    a framer module having an interface to accept a plurality of customer interface electrical signals from a plurality of customer interfaces, and an interface connected to the first, second, and third multiplexers to supply the plurality of customer interface electrical signals framed into an ITU-T G.984.3 Gigabit-capable Passive Optical Network (GPON) signal.

2. The ONU of claim 1 wherein the translation module converts an encrypted optical signal into an encrypted electrical signal;
    wherein the first and second ring ports distribute encrypted electrical signals; and,
    the ONU further comprising;:
    a deframer module having an interface connected to the translation module and an interface to supply a decrypted electrical signal to the customer interface.

3. The ONU of claim 2 wherein the translation module receives a GPON signal and converts the GPON optical signal into a GPON electrical signal; and,
    wherein the deframer module converts the GPON electrical signal into a customer interface electrical signal.

4. The ONU of claim 2
    wherein the plurality of customer interfaces are connected to the deframer module, each transceiving customer interface electrical signals with a user.

5. The ONU of claim 4 wherein the deframer module time division demultiplexes a GPON signal into a customer interface electrical signal for each customer interface, where the customer interface electrical signal is selected from a group consisting of Ethernet, asynchronous transfer mode (ATM), and time division multiplexing (TDM).

6. The ONU of claim 4 further comprising:
    a downlink multiplexer having an interface connected to the ring ports and the translation module to receive electrical signals, and an interface connected to the deframer to supply a multiplexed electrical signal.

* * * * *